(12) United States Patent
Bolognese

(10) Patent No.: US 7,638,011 B2
(45) Date of Patent: Dec. 29, 2009

(54) PROCESS FOR THE PRODUCTION OF A CURVED LAMINATED GLASS PANE

(75) Inventor: Litterio Bolognese, Vasto (IT)

(73) Assignee: Pilkington Italia S.p.A., San Salvo (IT)

( * ) Notice: Subject to any disclaimer, the term of this patent is extended or adjusted under 35 U.S.C. 154(b) by 205 days.

(21) Appl. No.: 10/560,180

(22) PCT Filed: Jun. 14, 2004

(86) PCT No.: PCT/EP2004/051106

§ 371 (c)(1),
(2), (4) Date: Dec. 9, 2005

(87) PCT Pub. No.: WO2004/110747

PCT Pub. Date: Dec. 23, 2004

(65) Prior Publication Data

US 2007/0029026 A1    Feb. 8, 2007

(30) Foreign Application Priority Data

Jun. 12, 2003   (EP) .................... 03425381

(51) Int. Cl.
B29C 65/00  (2006.01)
B32B 37/00  (2006.01)
B32B 17/10  (2006.01)
B32B 9/00   (2006.01)
B32B 27/42  (2006.01)
B29C 45/00  (2006.01)
B29C 47/00  (2006.01)
B29C 51/00  (2006.01)
B29D 24/00  (2006.01)
B29D 29/00  (2006.01)

(52) U.S. Cl. .............. 156/102; 156/101; 156/106; 428/430; 428/437; 264/511; 264/548

(58) Field of Classification Search ............ 156/99, 156/101, 102, 104, 106, 285, 382; 428/430, 428/437; 264/511, 544, 547, 548
See application file for complete search history.

(56) References Cited

U.S. PATENT DOCUMENTS 2,897,546 A * 8/1959 Clapp et al. .................. 264/339
3,900,673 A * 8/1975 Mattimoe et al. ............ 428/339
3,982,984 A * 9/1976 Baldridge .............. 156/244.16
4,557,776 A * 12/1985 Chabal et al. ................ 156/103
4,799,745 A    1/1989 Meyer et al.
4,973,364 A * 11/1990 Farrar et al. .................... 156/84
5,024,895 A    6/1991 Kavanagh et al.
5,145,744 A * 9/1992 Cartier et al. ............. 428/423.7

(Continued)

FOREIGN PATENT DOCUMENTS

DE   199 02 471 C2   8/2000

(Continued)

Primary Examiner—Richard Crispino
Assistant Examiner—Brian R Slawski
(74) Attorney, Agent, or Firm—Buchanan Ingersoll & Rooney PC

(57) ABSTRACT

Laminated glazing for automotive use in which a thermoplastic functional film is thermoformed and then cooled by forced draught, prior to the introduction between the glass sheets of the laminated glazing.

21 Claims, 5 Drawing Sheets

U.S. PATENT DOCUMENTS

| | | | |
|---|---|---|---|
| 5,205,895 A | 4/1993 | Hohman, Jr. et al. | |
| 5,208,080 A | 5/1993 | Gajewski et al. | |
| 5,209,881 A * | 5/1993 | Charbonnet | 264/493 |
| 5,238,743 A | 8/1993 | Grolig et al. | |
| 5,264,058 A * | 11/1993 | Hoagland et al. | 156/99 |
| 6,242,088 B1 | 6/2001 | Costa | |
| 6,261,398 B1 | 7/2001 | Costa | |
| 6,926,786 B2 * | 8/2005 | Frost et al. | 156/101 |
| 2001/0007270 A1 * | 7/2001 | Balduin et al. | 156/99 |

FOREIGN PATENT DOCUMENTS

| | | |
|---|---|---|
| EP | 326015 | 8/1989 |
| EP | 877664 | 11/1998 |
| JP | 60-193638 A | 10/1985 |
| WO | 91/19586 A1 | 12/1991 |
| WO | WO 91/19586 * | 12/1991 |
| WO | WO 00/26023 | 5/2000 |
| WO | WO 01/51279 | 7/2001 |

* cited by examiner

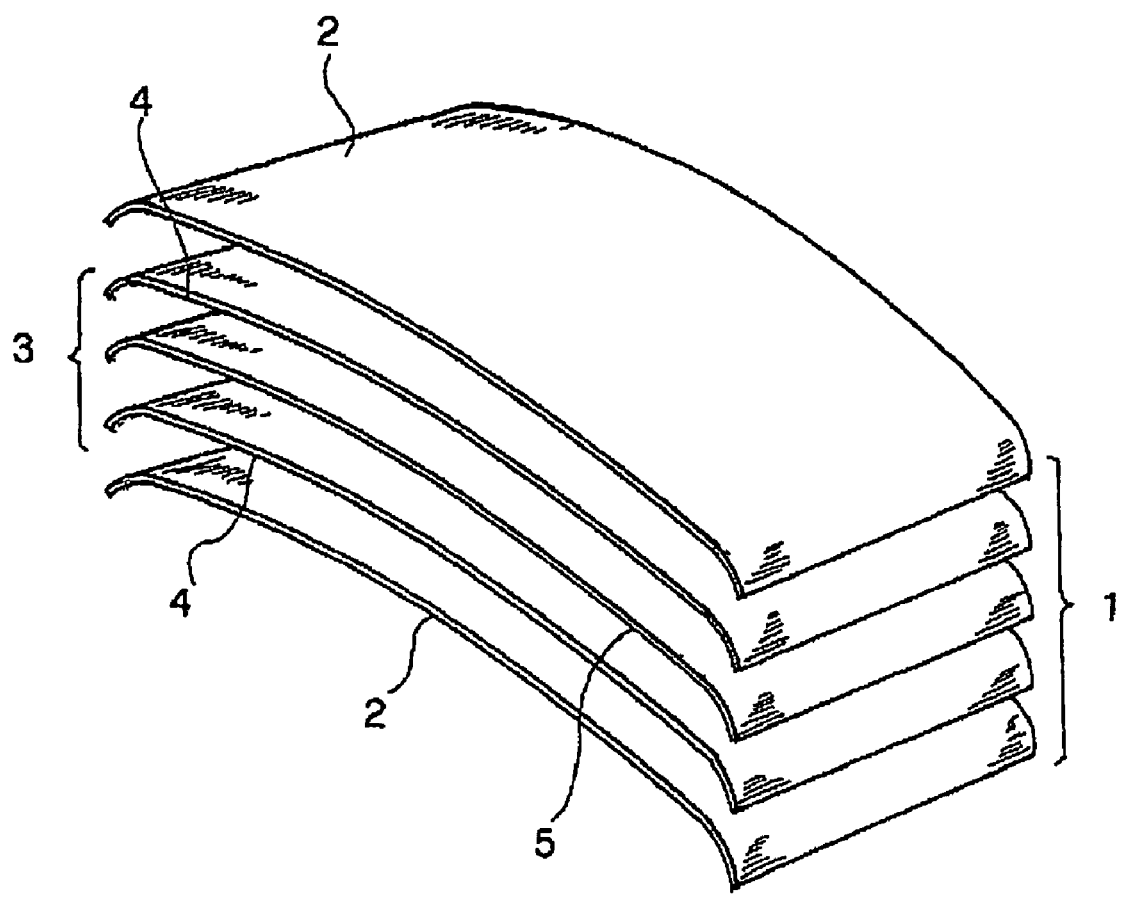
[Fig. 001]

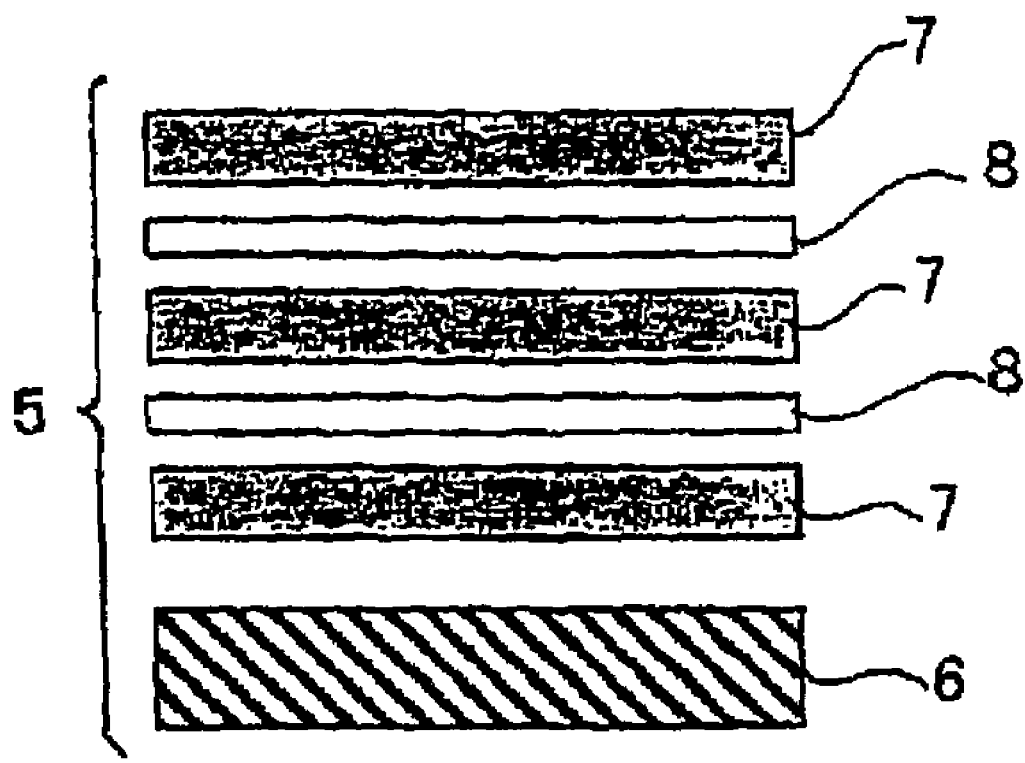
[Fig. 002]

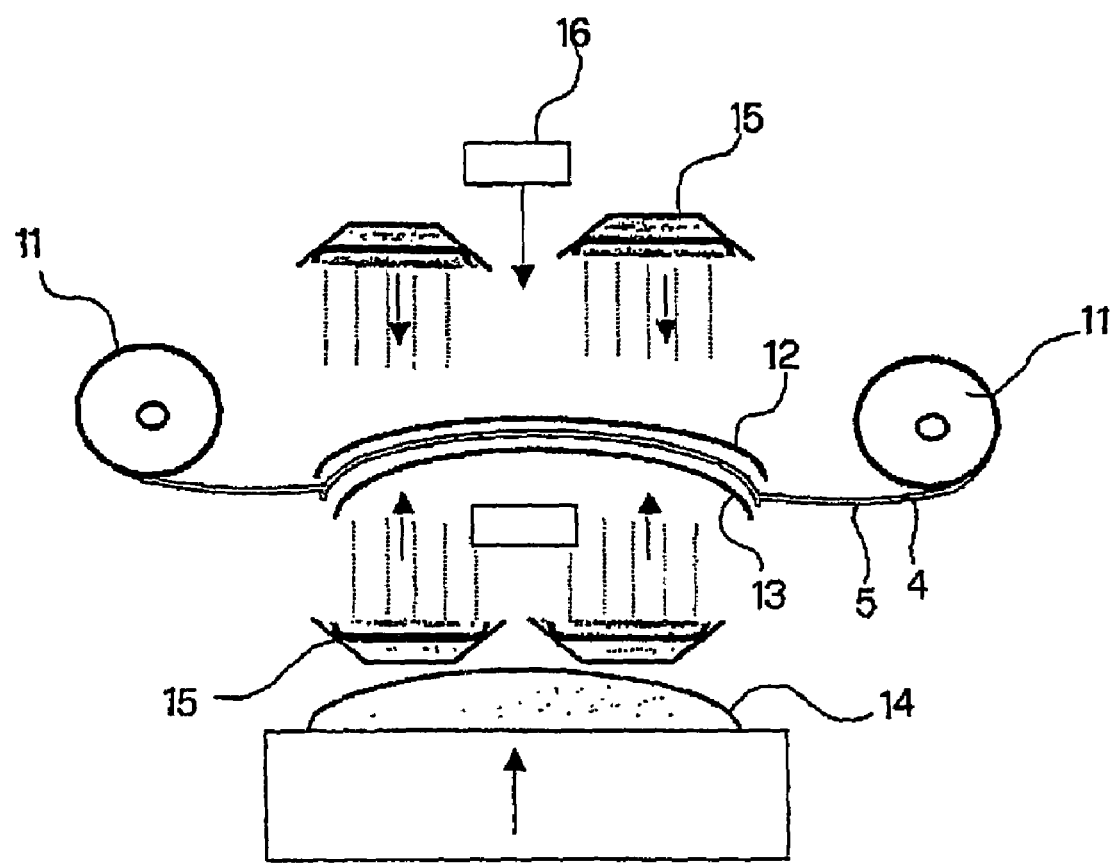
[Fig. 003]

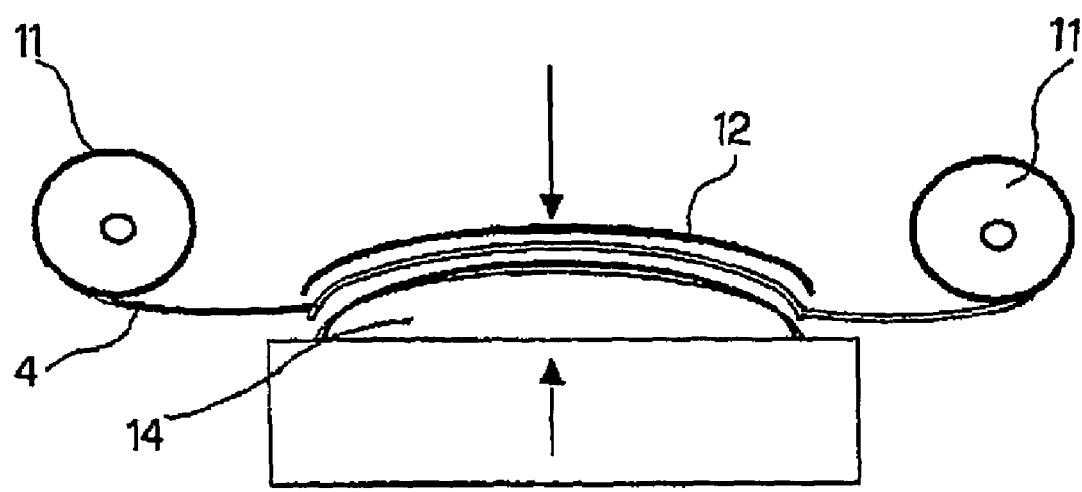
[Fig. 004]

[Fig. 005]
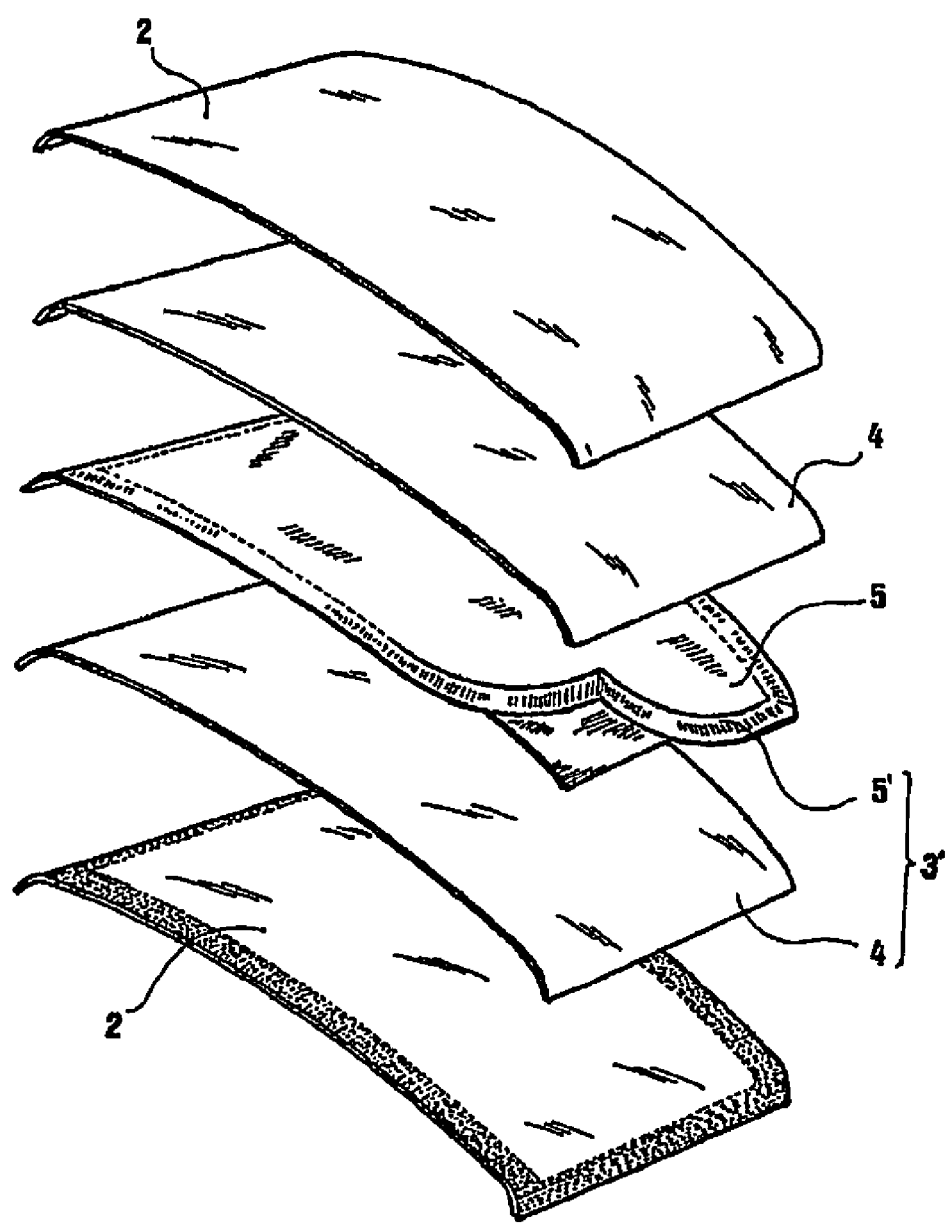

PROCESS FOR THE PRODUCTION OF A CURVED LAMINATED GLASS PANE

This application is based on and claims priority to European Application No. 03425381.5, filed on Jun. 12, 2003 and International Application No. PCT/EP2004/051106, filed on Jun. 14, 2004 designating the U.S., the entire contents of both of which are hereby incorporated by reference.

This invention relates to laminated glass panes which incorporate a transparent functional film embedded between the laminating layers, and to methods for the manufacture of such panes. The invention finds particular application in the manufacture of laminated automotive glazings, i.e. windshields, sidelights, backlights and rooflights or in other fields in which curved glazings may be employed, e.g. in the building industry.

Laminated glass panes comprise two or more sheets of glass, bonded together with an interlayer therebetween, comprising one or more layers of a bonding resin, which is typically polyvinylbutyral (PVB). The glass is usually an inorganic glass but rigid transparent organic materials, e.g. polycarbonate, may also be used. The resin used to bond the glass sheets may provide safety properties or establish a bond with one or more additional layers that are incorporated between the glass sheets to provide the end product with improved properties of strength, shatter-resistance and the like.

Commonly, a layer of PVB or ethylene vinyl acetate having a thickness in the range of 0.2 mm to 1.0 mm, typically 0.38 mm or 0.76 mm, is incorporated in the end product, e.g. to provide an automotive windshield having acceptable safety properties.

Frequently, laminated glass panes incorporate also a functional film as additional layer, e.g. a thermoplastic layer having peculiar physical properties, in combination with said interlayer. Most commonly, this film is embedded between two or more layers of a bonding resin, such as PVB, since the PVB is known to adhere well to the glass than a possible functional layer. Interlayer having a more complex structure, i.e. two different layers of functional film or alike therebetween, separated by an inner layer of bonding resin and placed between two outer layers of bonding resin, may be also used.

These functional films are used to impart additional properties to the pane, such as solar control properties, and in particular a filtering function for dazzling wavelengths, to decrease solar heat transmission, or to provide heating means or an increased safety.

An example of a material which is used to provide a functional film is polyethylene terephthalate (PET), possibly coated with further sub-layers for achieving said additional properties.

A typical laminated pane comprising a functional film formed from PET is described e.g. in U.S. Pat. No. 4,799,745.

One difficulty, which may arise from the incorporation of a functional film into a laminated pane, is the production of a laminate, which is transparent and free from any optical defects. The conventional laminating process using, for example, a layer of PVB as the bonding resin, comprises the step of heating the laminate inside an autoclave to a softening temperature for the PVB resin, allowing the resin to flow, thereby forming a transparent film having no significant optical defects. Generally, the functional thermoplastic films have a higher melting point than the PVB resin, thus they are not softened to the same degree at the PVB softening temperature. The result may be the production of a composite laminate having a creased or wrinkled appearance.

Such laminates are unacceptable for most uses, especially for automotive glazings.

This problem is particularly felt in relation to curved laminates such as automotive windshields, especially those having a high degree of cross curvature, where the risk to obtain a laminate having a wrinkled appearance is even greater. Moreover, the modern automotive design requires glazing surfaces with ever-increasing curvatures.

European patent application EP 877,664 A describes a process for the production of a laminated glass pane comprising a PET film as part of the interlayer, in which the PET is stretched prior to the lamination process in order to impart specific thermal shrinkage properties to the PET. The PET-containing interlayer is placed between two glass sheets and any excess is trimmed off prior to the final lamination step. Such procedures have been found to alleviate but not completely remove the problem of wrinkling, especially when the laminate is a curved laminate with a high degree of cross curvature.

U.S. Pat. No. 5,208,080 discloses a laminated composite glass pane having a functional film, having smaller dimensions than each glass pane. The gap surrounding the functional film is filled with a strip of an auxiliary film, preferably a strip of PVB. The use of such auxiliary film strip has been found disadvantageous in that it promote the formation of air bubbles and other distortions at the boundary of the functional film and the auxiliary strip.

In the International patent application Publ. No. WO 00/26023, coated laminated glass windshields are described, having an interlayer comprising a thermoplastic functional film wherein the edge of the functional film lies within a peripheral obscuration band.

An improved process, described in the International Application Publ. No. WO 01/51279, allows to drastically reduce wrinkles and creases without using any auxiliary film, reducing the size of the functional film by a peripheral trimming, whereby the possible wrinkles are eliminated and the interlayer outer edge lies within the edge of the glass panes.

In this case, a thin obscuration band, producing an opaque or partially opaque contour, may mask the uncoated reduced peripheral region.

Anyhow, such a contour can reduce, though very slightly, the transparent surface of the glazing, and such a process could be less than effective when the curvature of the end product exceeds certain values.

U.S. Pat. No. 5,025,895 describes a process in which a composite interlayer is pre-produced by gluing layers of bonding resin to functional layers. Subsequently, this composite interlayer is thermoformed and used to produce laminated glazings. However, these contrivances are complex and cannot always avoid the formation of wrinkles with reduced curvature radiuses.

U.S. Pat. No. 5,264,058 describes instead a process for manufacturing laminate glazings in which a plastics material layer is preformed at high temperature and, without cooling, employed to couple glass sheets, using the latter as heat sink to extract heat from the plastics material layer. Subsequently the glazing panel is treated in autoclave to obtain the final product However, also these contrivances are complex and cannot always avoid the formation of wrinkles with reduced curvature radiuses.

European patent application EP 0,326,015 A describes a process for manufacturing an interlayer in which the functional film is thermoformed and subsequently coupled to layers of bonding resin to adhere to glass sheets, however, in this case as well, the formation of wrinkles with reduced curvature radiuses cannot always be avoided.

At last, the International Application Publ. No. WO 91/19586 discloses a process wherein a composite interlayer is laminated with all the end layers, thermoformed on a mould and then allowed to cool. Again, the end product is not completely satisfactory.

Thus, from one aspect this invention provides a process for the production of a curved laminated glass pane comprising a first glass sheet and a second corresponding glass sheet, together with an interlayer comprising at least one bioriented thermoplastic functional layer, i.e. pre-stretched according to two directions substantially perpendicular therebetween in order to prevent wrinkling, and a corresponding at least one layer of a bonding resin having a reduced level of optical defects due to creasing of the interlayer, such process comprising the steps of positioning said interlayer between the two glass sheets and applying pressure and heat to form a laminated pane showing an end shape with one or more curvatures, which process is characterised in that said at least one bioriented thermoplastic functional layer is thermoformed on a mould together with said at least one layer of a bonding resin, in a configuration substantially corresponding to the end shape of said curved laminated glass pane, and then cooled by forced draught prior to being positioned between said glass sheets to form said interlayer.

In a preferred embodiment, the interlayer may comprise one or more functional layers cold-overlapped prior to thermoforming and then thermoformed in a single cycle, by heating to a softening temperature adequate for all the functional layers, depositing on a mould and applying vacuum between mould and interlayer, followed by a final cooling by forced draught.

According to another preferred embodiment, the functional layer comprises a peripheral pre-cut portion apt to be removed from the interlayer. In this embodiment, one bonding resin layer is adhered to one face of said functional layer, the latter being subsequently cold-stamped in a configuration substantially corresponding to the end shape of said curved laminated glass pane, placed a mould and heated and then cooled by forced draught. This thermoforming step allows the thermoplastic functional layer to be permanently shaped after the subsequent cooling by forced draught.

The resulting interlayer is positioned on a glass glazing adhering the bonding resin to the glass surface, and said precut portion is peeled off, whereby the outer edge of the functional layer remains to a certain distance from the edge of the glazings. Then, a further bonding resin layer is applied on the exposed functional layer surface before positioning a second glass glazing on it and applying pressure and heat to form a laminated glazing showing an end shape with one or more curvatures.

The invention finds particular application in the production of curved laminated automotive glazings, especially windshields, which have a high degree of cross curvature, say even over 20.0 mm. It is also applicable to glazings which have a relatively small radius; e.g. at least one curve having a radius of less than 10.000.0 mm and possibly less than 10.0 mm at least one point on their surface.

This process allows to obtain glazings free from any optical defects even at their edges, making peripheral obscuration bands superfluous.

Two embodiments of the invention are hereinafter described, by way of example and not for limitative purposes with reference to the accompanying drawings, wherein:

FIG. 1 is a schematic exploded view of a windshield constructed with the process according to one embodiment of the present invention;

FIG. 2 schematically illustrates the composition of a functional film to be used in the process according to one embodiment of the present invention;

FIG. 3 schematically illustrates a step of the process according to one embodiment of the present invention; and FIG. 4 illustrates another step of the process according to the present invention; and FIG. 5 is a schematic exploded view of a windshield constructed according to a second embodiment of the present invention.

By reference to the FIGS. 1 to 4, the present process for the production of a curved laminated glass pane has the object of providing a pane 1 comprising a pair of shaped glass sheets 2 and showing a shape having one or more curvatures.

Between the glass sheets, as mentioned in the foregoing, an interlayer 3 that carries out a two-fold task is introduced. In fact, the interlayer 3 according to this embodiment comprises three layers: in particular, two layers 4 of a bonding resin positioned into contact with said glass sheets 2 in order to provide the adhesive bond strength required to keep them joined and one layer of functional layer 5.

Said bonding resin is preferably polyvinylbutyral (PVB).

For functional layer it is meant a layer carrying out a predetermined function, e.g. a filter with particular optical properties to abate the radiant solar energy crossing the glass pane 1, a coloured layer to colour the glass pane, a partially reflecting layer, a conductive layer prearranged for the thermal heating of the glass.

A film in polyethylene terephthalate (PET) with very reduced thicknesses provides adequate support for the functional layer. Other adequate supports are formed from other thermoplastic resins.

In the case of materials having thermal shrinkage properties, as in the case of PET, the film for the functional layer is advantageously bioriented, i.e. it has been stretched according to two axes substantially normal therebetween.

In this embodiment (FIG. 2), the selected functional layer comprises a film in PET, indicated by 6, with various performance sub-layers deposited on one surface of the PET. In particular, there are deposited three filtering sub-layers 7 in metal oxide and two reflecting sub-layers 8, in silver, alternated thereamong.

However, it is understood that the number of performance sub-layers in bonding resin, of functional layers and of glass sheets may be varied in order to meet contingent needs.

The process according to this embodiment comprises thermoforming the interlayer 3, i.e. the layers 4 in bonding resin and the functional layer 5.

Said layers are suitably pre-laminated and wound on a roll 11 of a winding machine. They are unwound and inserted between a top moulding 12 and a bottom moulding 13, positioned above a curved mould 14 (FIG. 3).

The films are fastened to the mouldings 12, 13 by a snap fastening system, the edge subjected to pinching will have a thickness of 15-20 mm.

At this stage, the layers 4, 5 blocked between the mouldings 12, 13 are removed from the mould and subjected to heating, say by a radiant panel heating system 15 with infrared lamps.

The heating temperature is set at 130° C.+/−30° C.

A temperature detection system is advantageously operated, using an infrared pyrometer 16 with a sensor of wavelength typical of the abovedescribed plastic materials, which detects the temperature rise of the film overlapping. As soon as the temperature reaches the preset value an electric command signal activates a system that interrupts the heating, i.e. retracts the heating panels from the films.

According to a preferred version, during the heating, a hot airjet is injected from the bottom so as effect a film pretensioning prior to positioning them on the mould.

Then, after a blowing time of from 1 to 3 seconds, the mould raises bottom to top or lowers top to bottom forcing the layer, held stationary by the two mouldings 12, 13, to assume its shape. All of these thermoforming steps are carried out under vacuum, thereby further fostering the formation of the layer resulting from the overlapping of the abovedescribed films (FIG. 4).

After some seconds of pressing by vacuum application, a cold airjet is activated that cools said layer to a temperature of about 30-40° C., freezing the shape of the functional layer 5 and, consequently, of the binding resin layers 4.

After this cooling, operated by forced draught, the two mouldings 12, 13, which held the interlayer 3 stationary along all these steps, reopen, and the operator can recover the shaped interlayer 3 which, in order to better retain the impressed shape characteristics, may be stowed on a support having the same shape of the mould used for the thermoforming.

The thermoformed overlapping of the functional layer 5 and of the layers in bonding resin 4 can be used to manufacture curved glass panes according to usual techniques, yet with the option of employing very reduced curvature radiuses.

Therefore, the process according to this embodiment further comprises the step of positioning said interlayer 3 between the two glass glazings 2 in a suitable autoclave, wherein appropriate pressure and heat are applied, to form a laminated pane characterised by an end shape with one or more curvatures.

This step realizes the binding between the sheets of glass, by virtue of the adhesion of the bonding resin layers 4 to the respective glazing surface.

The peripheral margin of the interlayer 3 shows no wrinkles or creases, which therefore may not need to be masked by a dotted area impressed on the inner surface of the external glass glazings (i.e., in the automotive of building field, the glazings intended to be placed at the external side) or on the inner surface of the internal glass glazings (i.e., in the automotive of building field, the glazings intended to be placed at the internal side).

A second embodiment of the present process for the manufacture of laminated glass panes which incorporate a transparent functional film embedded between the laminating layers is hereinafter described.

According this embodiment, the interlayer 3' is composed by one functional layer 5 as above specified, and by one bonding resin layer, adhered to one face of the functional layer.

Along its whole edge, the functional layer comprises a pre-cut peripheral portion 5' (FIG. 5), apt to be removed in a subsequent step of the present process.

Before the thermoforming and the cooling steps of the preceding embodiment, the interlayer 3' is cold-stamped, i.e. is pre-formed at room temperature. This cold-stamping step involves the bioriented thermoplastic functional layer 5 and the corresponding layer of a bonding resin, which are shaped in a configuration substantially corresponding to the end shape of the curved laminated glass pane to be manufactured.

For the thermoforming step, vacuum is applied to the interlayer 3', to make it adhere to a suitable mould, having a shape substantially corresponding to the end shape of the curved laminated glass pane to be manufactured. The interlayer 3' is positioned with the functional layer 5 perfectly adherent to the mould surface.

By appropriate heating means, the interlayer 3' is heated to a softening temperature of the thermoplastic material of the functional layer, i.e. a temperature of 130° C.+/−30° C.

The heating phase can be carried out by a radiant panel heating system with infrared lamps, with a temperature detection system using an infrared pyrometer 16 with a sensor of wavelength typical of the above described thermoplastic materials, which detects the temperature rise of the film overlapping. As soon as the temperature reaches the preset value an electric command signal activates a system that interrupts the heating, i.e. retracts the heating panels from the films.

After some seconds, a cold airjet is activated that cools said layers to a temperature of about 30-40° C., freezing the shape of the functional. Thus, the bioriented thermoplastic functional layer 5 is permanently shaped by the cooling by forced draught.

After the above described thermoforming and cooling steps, the interlayer 3' is positioned over one glass glazing, which is intended to be an internal glazing, i.e. intended to be placed at the internal side of the final glass pane. The bonding resin layer 4 is applied to the glass surface.

At this stage, said pre-cut portion 5' is peeled off, whereby the outer edge of the functional layer 5 remains to a certain distance from the edge of the receiving glazing.

Then, a further bonding resin layer 4 is applied at least on the exposed functional layer 5 surface, and a second glass glazing is positioned on it, the shape thereof perfectly matching with the shape of the first glazing and of the interlayer 3' covered by said additional bonding resin layer 4.

In this connection, the composite glass pane according to the present invention reaches its final composition (FIG. 5). This semi-finished product is now placed into appropriate means for applying pressure and heat (e.g. an autoclave) to form a laminated glazing showing an end shape with one or more curvatures.

According to the second embodiment, the functional layer 5 shows a linear edge near to the glazing edge, which is almost intelligible and which can easily hidden by a peripheral dotted area impressed on the inner face of the inner glazing. This configuration is easier to be obtained than that with a peripheral dotted area impressed on the inner face of the outer glazing.

Moreover, since the functional layer is kept to a distance from the external edge of the final glass pane, it is effectively protected by the corrosion due to the infiltration of atmospherical agents or the like between the glazings at the edge thereof.

To the abovedescribed process a person skilled in the art, in order to satisfy further and contingent needs, may effect several further modifications and variants, all however encompassed by the protective scope of the present invention, as defined by the annexed claims.

The invention claimed is:

1. A process for the production of a curved laminated glass pane comprising a first glass glazing and a second corresponding glass glazing, together with an interlayer comprising at least one bioriented thermoplastic functional layer and at least one layer of a bonding resin, such process comprising the steps of:

thermoforming on a mould said at least one bioriented thermoplastic functional layer, together with at least one layer of a bonding resin adhered to said at least one bioriented thermoplastic functional layer, in a configuration substantially corresponding to the end shape of said curved laminated glass pane;

positioning said interlayer between the two glass glazings and applying pressure and heat to form a laminated glazing showing an end shape with one or more curvatures; and wherein, before the thermoforming step, said at least one bioriented thermoplastic functional layer and at least one layer of a bonding resin are heated and, during such heating, a hot air jet is injected from the bottom so as to effect a pretensioning of said at least one functional layer and then, after the thermoforming step and before said positioning said interlayer between the two glass glazings, said at least one functional layer and said at least one layer of a bonding resin are cooled by forced draught, whereby the shape of said at least one functional film is frozen.

2. A process according to claim 1, wherein said interlayer comprises two bonding resin layers, intended to be positioned into contact with distinct glass glazings, each adhered to the opposite side of one functional layer.

3. A process according to claim 1, wherein said interlayer comprises one functional layer, and a corresponding one bonding resin layer, adhered to one face of the functional layer, the functional layer comprising, along its whole edge a pre-cut peripheral portion, apt to be removed in a subsequent step.

4. A process according to claim 3, wherein, before the thermoforming and the cooling steps, said interlayer is cold-stamped in a configuration substantially corresponding to the end shape of the curved laminated glass pane to be manufactured.

5. A process according to claim 4, wherein, in the thermoforming step, vacuum is applied to the interlayer to make it adhere to the mould with the functional layer adherent to the mould surface.

6. A process according to claim 3, wherein, in the positioning step, the shaped interlayer is positioned over one glass glazing, with the bonding resin layer is applied to the glass surface.

7. A process according to claim 6, wherein said one glass glazing is intended to be at the internal side of the final glass pane.

8. A process according to claim 7, wherein said pre-cut portion is peeled off when the interlayer has been positioned over said one glass glazing, whereby the outer edge of the functional layer remains to a certain distance from the edge of said one glazing.

9. A process according to claim 8, wherein, in the positioning step, a further bonding resin layer is applied at least on the exposed functional layer surface, and a second glass glazing is positioned on it, the shape thereof perfectly matching with the shape of said one glazing and of the interlayer covered by said additional bonding resin layer.

10. A process according to claim 1, wherein, before the thermoforming and the cooling steps, said interlayer is cold-stamped in a configuration substantially corresponding to the end shape of the curved laminated glass pane to be manufactured.

11. A process according to claim 1 wherein said bonding resin is polyvinylbutyral (PVB).

12. A process according to claim 1 wherein the glass pane is a curved glass pane having a cross curvature of at least 5.0 mm.

13. A process according to any claim 1 wherein the glass pane is a curved glass pane wherein at least a part of the curved surface has a radius of less than 10000 mm.

14. A process according to claim 1 wherein said functional layer comprises a film in polyethylene terephthalate with one or more filtering and/or reflecting sub-layers adhered thereto.

15. A process according to claim 1 wherein in the thermoforming the heating temperature is set at 130° C.+/−30° C.

16. A process according to claim 1 wherein in the thermoforming there is employed a temperature detection system with use of an infrared pyrometer with a wavelength sensor which detects the temperature rise of said at least one bioriented thermoplastic functional film and said suitable layers of a bonding resin and, as soon as the temperatures reaches the preset value, activates a system that interrupts the heating.

17. A process according to claim 3, wherein, in the thermoforming step, vacuum is applied to the interlayer to make it adhere to the mould with the functional layer adherent to the mould surface.

18. A process according to claim 4, wherein, in the positioning step, the shaped interlayer is positioned over one glass glazing, with the bonding resin layer is applied to the glass surface.

19. A process according to claim 5, wherein, in the positioning step, the shaped interlayer is positioned over one glass glazing, with the bonding resin layer is applied to the glass surface.

20. A process according to claim 6, wherein said pre-cut portion is peeled off when the interlayer has been positioned over said one glass glazing, whereby the outer edge of the functional layer remains to a certain distance from the edge of said one glazing.

21. A process for the production of a curved laminated glass pane comprising a first glass glazing and a second corresponding glass glazing, together with an interlayer comprising at least one bioriented thermoplastic functional layer and at least one layer of a bonding resin adhered to the at least one biorented thermoplastic functional layer, the process comprising:

contacting the at least one functional layer with a mould so as to thermoform, on the mould, the at least one functional layer together with the at least one layer of a bonding resin, in a configuration substantially corresponding to an end shape of the curved laminated glass pane;

positioning the interlayer between the two glass glazings and applying pressure and heat to form a laminated glazing showing the end shape; and prior to contacting the at least one functional layer with the mould, heating the at least one functional layer while injecting hot air so as to effect a pretensioning of the at least one functional layer.

* * * * *